Patented Dec. 29, 1953

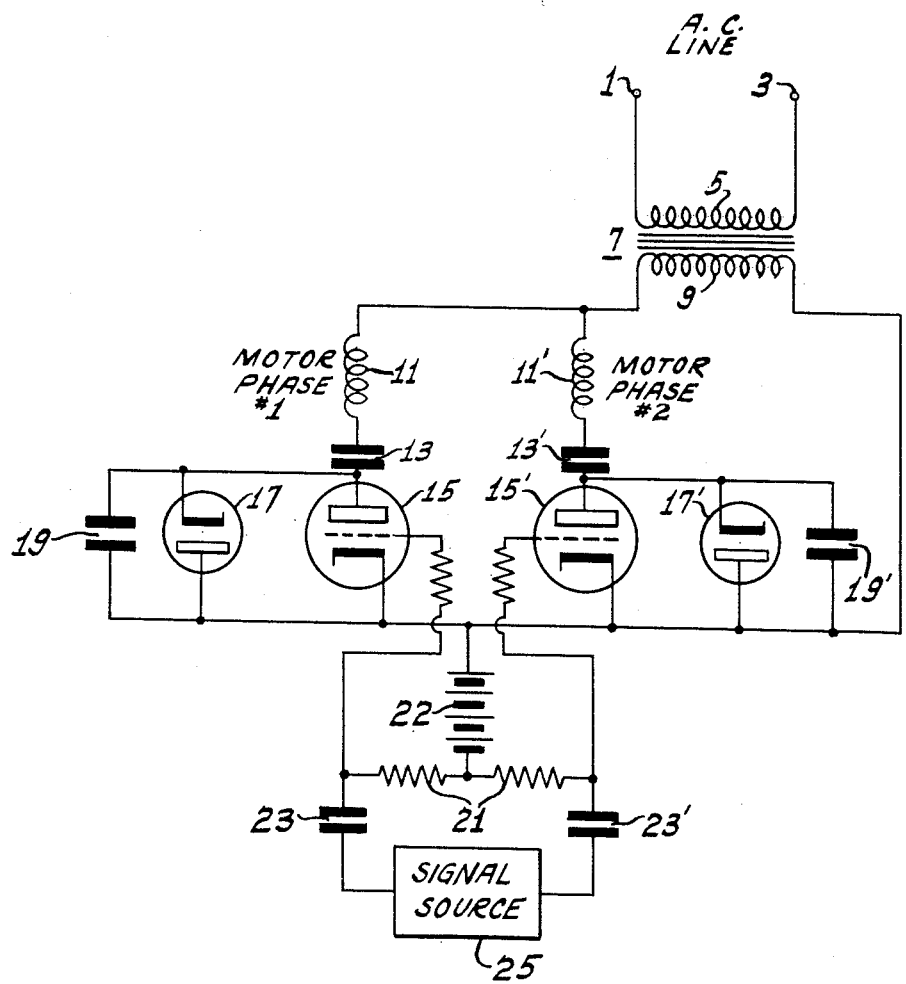

2,664,533

UNITED STATES PATENT OFFICE 2,664,533

ELECTRONIC MOTOR CONTROL CIRCUIT

Herman P. Raab, Indianapolis, Ind., assignor to Radio Corporation of America, a corporation of Delaware Application April 17, 1951, Serial No. 221,384

4 Claims. (Cl. 318—221)

This invention relates generally to the control of electric motors and more particularly to controlling the speed and/or angular displacement of alternating current motors.

Accurate control of the speed or angular displacement of an electric motor is desirable in many applications, for example, the control of guns, searchlights, directive radio antennas and the like. In displacement control systems it is usually desirable to control the relatively large mechanical power output of a motor in response to a relatively small input such as may be conveniently produced by a manually operable crank or an indicator. Direct current motors are particularly adapted to such applications which require wide variation of motor speed and motor torque. However, alternating current motors are less expensive and alternating current energy is usually more readily available than is direct current energy. Thus, for reasons of economy, it is frequently desirable to employ an A.-C. motor, although the control circuits may be more complex than those which would be required for a D.-C. motor.

Some previous control circuits for two-phase A.-C. motors apply fixed excitation to one winding and vary the amplitude and polarity of excitation of the remaining winding while maintaining a fixed phase relation between the currents in the two windings. The instant invention provides novel means for controlling the speed and/or angular displacement of two-phase motors by varying the relative phases of the currents flowing through the phase windings.

It is an object of this invention to provide an improved means for controlling the speed and direction of rotation of an A.-C. servomotor in response to the magnitude and polarity of an applied alternating potential.

Another object of the invention is to provide an improved full wave servomotor control circuit for controlling simultaneously the loading of two windings of a reversible induction servomotor in response to the polarity and magnitude of an applied control potential.

A further object of the invention is to provide an improved full wave servomotor control circuit for controlling a two-phase induction motor by varying the relative phases of the currents flowing through the motor phase windings in response to the polarity and magnitude of an applied control signal.

According to a typical embodiment of the instant invention, there is disclosed a circuit in which a thermionic triode, a thermionic diode, and a blocking capacitor constitute a bilateral dissipative unit of high impedance. Shunting this high impedance unit is a phasing capacitor to which is serially connected one winding of a two-phase servomotor. Similar circuitry is connected to the second winding of the two-phase servomotor. With no control signal applied to said units, which are both normally of high impedance, the motor windings are supplied with excitation current through the identical phasing capacitors. The excitation currents of both windings are then in phase and hence no torque is produced. Application of a push-pull control signal to these bilateral dissipative units, however, causes the impedance of one of the units to approach a low value. This shunts its associated phasing capacitor and effectively shifts the phase of the excitation current flowing through the phase winding connected thereto. Hence, output torque is developed and the motor rotates, its direction of rotation and speed being dependent upon the polarity and magnitude, respectively, of the control signal.

The invention will be described in greater detail with reference to the accompanying drawing in which the single figure is a schematic circuit diagram, according to the invention, of a control circuit for a two-phase servomotor in which the speed and direction of rotation are controlled by respectively varying the magnitude and phase relation of the currents flowing in the two windings of the motor.

Referring to the drawing, a source of alternating potential, not shown, is connected to input terminals 1 and 3 terminating the primary winding 5 of a transformer 7 having a secondary winding 9 coupled thereto. One end of the transformer secondary winding 9 is successively connected to one phase winding 11 of the two-phase motor, a D.-C. blocking capacitor 13, and to the anode electrode of an amplifier tube 15. The cathode electrode of the amplifier 15 is then returned to the remaining end of the transformer secondary 9. A diode tube 17 is connected "back-to-back" with the triode amplifier 15; that is, the tubes are parallel connected but oppositely polarized. Shunting the "back-to-back" connected triode 15 and diode 17 and the D.-C. blocking capacitor 13, is a phasing capacitor 19. Similar circuitry connected to a second field winding 11', one end of which is connected to the same end of the transformer secondary winding 9 as is the first field winding 11, is designated by primes.

A center-tapped resistor 21, which is connected between a bias supply 22 and the control electrodes of the triode amplifiers 15 and 15', and a pair of coupling capacitors 23 and 23' provide means for applying a control signal from a push-pull signal source 25 to the motor control circuit.

When the circuit is in operation and no control signal is applied thereto, the triode amplifiers 15 and 15' are cut-off, and flow of current in diode tubes 17 and 17' is prevented by blocking capacitors 13 and 13', respectively.

The two-phase windings 11 and 11' are then supplied with excitation current through the identical phasing capacitors 19 and 19'. Since the currents in the two motor windings 11 and 11' are in phase, no output torque is developed.

A push-pull control signal is applied to the control electrodes of the triodes 15 and 15' and is of proper phase with respect to the line potential so that one of the triodes, for Example 15, conducts on positive half-cycles of the control signal, thereby shunting its associated phasing capacitor 19 by said conduction reducing the impedance of the bilateral dissipative unit to a relatively low value. Since the phasing capacitor 19 is shunted, the current through the associated motor winding 11 is effectively shifted in phase. On negative half-cycles of the control signal the associated diode 17 effectively conducts. The blocking capacitor 13 permits no D.-C. current to flow through the motor winding 11 so the uncontrolled diode current cannot exceed the controlled triode current. Thus the two-phase motor windings 11 and 11' are effectively excited with full wave energy, and because of the shunting of the phasing capacitor 19 the motor develops the necessary output torque for rotation.

A control signal of the opposite instantaneous polarity causes the opposite triode amplifier 15' to shunt its associated phasing capacitor 19' so the motor runs in the reverse direction. It is evident that the phase of the push-pull control signal may be adjusted to provide maximum motor torque in either direction. The conductance of the thermionic tubes 15 and 15' and 17 and 17' determines the effective impedance which shunts the associated phasing capacitors. By proper selection of the phasing capacitors 19 and 19' and tube plate impedances, the full capabilities of the motor may substantially be realized. A tetrode, pentode, or other multigrid tube may be substituted for the triodes used herein.

The motor control circuit thus disclosed is particularly advantageous when a number of separate servomotors are used in a given system. It may be seen that only one isolation transformer is required therein and also that a single secondary winding for this transformer may supply a plurality of servomotors.

What is claimed is:

1. A control circuit for a two-phase motor having a pair of field windings, said circuit comprising connection means for coupling a first source of alternating potential to said motor windings, a pair of thermionic tubes parallel connected in opposite polarity and in series with each of said windings, a capacitor in series with each of said windings and tube pairs, a phasing capacitor in parallel with each of said tube pairs, and connection means for a second source of alternating potential for coupling control signals from said second source to an electrode of a tube of each of said pairs for shunting one of said phasing capacitors to load said motor to produce rotation thereof.

2. A control circuit for a two-phase induction motor having a pair of field windings, said circuit comprising connection means for coupling a first source of alternating potential to said motor windings, a pair of thermionic tubes parallel connected in opposite polarity and in series with each of said field windings, a blocking capacitor serially connected with and intermediate each field winding and tube pair associated therewith, a phasing capacitor connected in parallel with each of said tube pairs and in series with each of said blocking capacitors, connection means for a second source of alternating potential, and means for applying control signals from said second source in push-pull relationship to an electrode of one tube of each of said tube pairs for shunting one of said phasing capacitors to load said motor to produce rotation thereof.

3. A control circuit for a two-phase motor having a pair of field windings, said circuit comprising connection means for coupling a first source of alternating potential to said motor windings, a pair of thermionic tubes parallel connected in opposite polarity and in series with each of said field windings, a blocking capacitor serially connected with and intermediate each field winding and tube pair associated therewith, a phasing capacitor in parallel with each of said tube pairs, and connection means for a second source of alternating potential for coupling control signals from said second source to shunt one of said phasing capacitors to load said motor to produce rotation thereof.

4. A control circuit for a two-phase induction motor having a pair of field windings, said circuit comprising connection means for coupling a first source of alternating potential to said motor windings, a pair of thermionic tubes comprising a diode and a triode parallel connected in opposite polarity and in series with each of said field windings, a blocking capacitor serially connected with and intermediate each field winding and tube pair associated therewith, a phasing capacitor connected in parallel with each of said tube pairs and in series with said blocking capacitors, connection means for a second source of alternating potential, and means for applying control signals from said source in push-pull relationship to the triodes of said tube pairs for shunting one of said phasing capacitors to load said motor to produce rotation thereof.

HERMAN P. RAAB.

References Cited in the file of this patent

UNITED STATES PATENTS

| Number | Name | Date |
| --- | --- | --- |
| 2,351,759 | Grundmann | June 20, 1944 |
| 2,351,760 | Beers | June 20, 1944 |
| 2,473,494 | Wannamaker | June 14, 1949 |

FOREIGN PATENTS

| Number | Country | Date |
| --- | --- | --- |
| 587,525 | Germany | Nov. 4, 1933 |

OTHER REFERENCES

"The Solar System," vol. IV, No. 1 May–June 1946, page 14, Solar Manufacturing Corp., N. Y.